Oct. 4, 1955 A. VAN WEEL 2,719,915

AUTOMATIC GAIN CONTROL AMPLIFIER

Filed June 26, 1952

INVENTOR
Adelbert Van Weel
BY [signature]
AGENT

United States Patent Office 2,719,915

Patented Oct. 4, 1955

2,719,915

AUTOMATIC GAIN CONTROL AMPLIFIER

Adelbert van Weel, Eindhoven, Netherlands, assignor to Hartford National Bank and Trust Company, Hartford, Conn., as trustee Application June 26, 1952, Serial No. 295,671

Claims priority, application Netherlands July 28, 1951

5 Claims. (Cl. 250—20)

Figures 1, 2:
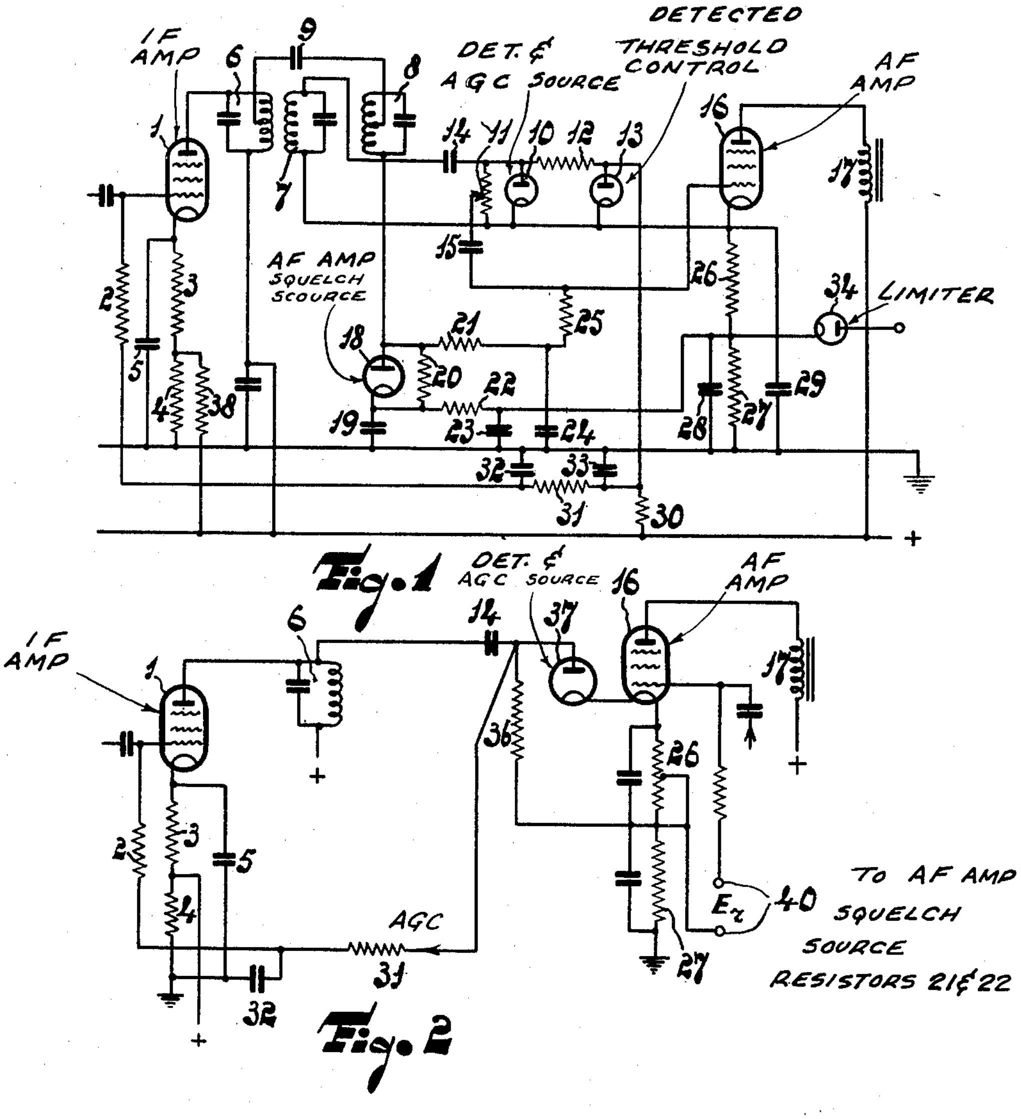

The invention relates to radio receiving circuit-arrangements, comprising means to reduce greatly the amplification factor of one or more amplifying tubes included in the intelligence signal channel by supplying a negative voltage to the control grid or grids, if the high-frequency circuits of the receiver are detuned by a given amount relative to the frequency of the signal to be received. Such circuit-arrangements are known. The said negative voltage may vary with the tuning in a manner determined by the intermediate-frequency signal and will assume a comparatively low value if the receiver is tuned correctly. With the known circuit-arrangements, the negative voltage is usually supplied to a low-frequency amplifying tube, if the tuning is incorrect.

It has also been suggested to reduce the amplification of one or more high-frequency or intermediate-frequency tubes, for example, by applying a positive voltage to the control-grids, if the tuning is incorrect, so that grid current begins to flow.

These known circuit-arrangements either do not give satisfactory results or they are comparatively complicated. It is, moreover, impossible to make the high-frequency or the intermediate-frequency amplifying tubes completely inoperative. It is particularly disadvantageous if, in addition, automatic gain control is carried out with the use of a negative control-voltage supplied to control-grid(s) of high-frequency and/or intermediate-frequency tube(s), the absolute value of this voltage increasing with an increase in carrier-wave amplitude of the signal. Many circuit-arrangements in which one or more tubes for low-frequency amplification are made inoperative in the case of incorrect tuning have a limitation in that distortion occurs during the transition to the inoperative condition. This is particularly the case if a tube which is made inoperative has negative feed-back, since upon variation of the grid voltage to a given negative value the total amplification factor tends to remain constant. In this case the control has the result that the working point of the tube shifts to the curved part of the characteristic curve and the total negative feedback decreases; both conditions give rise to distortion.

With these circuit-arrangements it has also been suggested to perform the transition from the normal condition into the substantially non-conductive condition of the low-frequency amplifying tube more abruptly. In a known circuit-arrangement, this is carried out by using a diode in the grid circuit, which diode is conductive or non-conductive in accordance with tuning, and causes the working point of the amplifying tubes on the characteristic curves to shift with the transition from one condition into the other. This circuit-arrangement is comparatively involved.

The invention has for its object to provide a circuit-arrangement in which "silent tuning" is obtained in a simple manner and substantially without distortion.

According to the invention, a radio receiving circuit-arrangement comprising means by which, with a given detuning of the high-frequency circuits with respect to the frequency of the signal to be received, the amplification factor of one or more amplifying tubes included in the intelligence signal channel is greatly reduced by supplying a negative voltage to the control-grid, automatic gain control being at the same time obtained by variation of the negative bias voltage of one or more high-frequency or intermediate-frequency amplifying tubes, is characterized in that across the automatic gain control circuit which produces an automatic gain control voltage is developed a control potential varying with the mean carrier wave amplitude of the incoming signal, the control potential being reduced when the tube becomes inoperative to an extent at which the total voltage for the automatic gain control increases in absolute value.

The counter-acting voltage may be derived from the anode current of one of the tubes; if necessary, an additional tube may be included. A very simple circuit-arrangement is obtained if the counter-acting voltage is derived from a resistor included in the cathode lead of an amplifying tube, preferably a low-frequency amplifying tube, which is made inoperative with a given detuning.

With such a circuit-arrangement, the intermediate-frequency voltage occurring across the detector will, consequently, decrease when the said amplifying tube becomes inoperative, so that also the signal supplied to the detector decreases. Thus the distortion occurring in the circuit-arrangement decreases and the sound level drops, so that distortion, if any, is less troublesome.

The control-voltage for the automatic gain control may be composed of three voltages; i. e., a normal control-voltage derived from the intermediate-frequency signal, a voltage which is proportional to the cathode current of a low-frequency tube to be made inoperative and a substantially constant voltage counter-acting the latter voltage and neutralizing the said cathode voltage when the low-frequency tube is normally operative. The latter voltage may be obtained by means of resistors included in the cathode lead of one or more of the high-frequency or intermediate-frequency amplifying tubes.

In order to keep the voltage across this resistor constant, a point of the resistor may be connected to a point of constant potential. This point may, for example, be connected via a high resistor to the positive terminal of the supply source.

The invention will now be described with reference to the accompanying diagrammatic drawing, given by way of example, in which:

Fig. 1 shows, as far as is essential for the understanding of the invention, the circuit diagram of a receiver according to the invention, and Fig. 2 shows a circuit diagram which is a slight modification of that shown in Fig. 1.

Referring now to Fig. 1, pentode 1 operates as the last intermediate-frequency amplifying tube and to the first grid of tube 1, the intermediate-frequency voltages are supplied by way of a capacitor from the preceding part of the circuit-arrangement. A control-voltage for automatic gain control is supplied to the first grid of tube 1 through a resistor 2. Between the cathode of the tube 1 and earth, provision is made of the series combination of resistors 3 and 4, which is shunted by a capacitor 5 constituting an effective short-circuit for voltages of the intermediate-frequency. The junction of the resistors 3 and 4 is connected through a high resistor 38 to a point of positive potential in order to keep the voltage across the resistors 3 and 4 substantially constant.

The anode of the tube 1 is connected to a circuit 6, tuned to the intermediate frequency and coupled with a circuit 7, together with which it constitutes an intermediate-frequency bandpass filter. The voltages to be detected are taken from the secondary circuit 7 and supplied through a capacitor 14 to a diode 10. The low-frequency voltages obtained are supplied through a capacitor 15 to the first grid of a low-frequency amplifying pentode 16, of which the anode circuit comprises an impedance 17 from which the low-frequency voltages are taken. The cathode of the diode 10 is connected directly to the cathode of the tube 16. The diode 10 provides the automatic gain control voltage across resistor 11, which is supplied through resistors 12, 31 and 2 to the first control-grid of the tube 1. Capacitors 32 and 33 are smoothing capacitors for the automatic gain control voltage. A diode 13 serves to supply a definte threshold voltage; the anode of diode 13 is connected to the right-hand end of the resistor 31 and also through a resistor 30 to a point of positive potential, for example, the positive terminal of the supply source. As long as the amplitude of the signal occurring across the circuit 7 remains below a given value, the diode 13 is conductive, so that the voltage of the anode of diode 13 remains substantially constant, when the amplitude of the said signal varies. Thus, a threshold voltage is set up across the resistor 12 for the diode 10, which substantially prevents detection from occurring before the intermediate-frequency signal has exceeded a definite value. The tube 13 is only conductive when the received signal is weak. Tube 10 is always conductive but it carries only a small current in the absence of signal. Upon detection by the diode 10, a definite direct-current component will occur across the resistor 11, so that the anode of the diode 10 becomes more negative. The diode 13 will become cut off if the intermediate-frequency signal exceeds a definite value, so that upon a further increase in signal strength the potential of the anode of the diode 13 can further decrease.

The part of the circuit-arrangement described so far is known. It is also known with such circuit-arrangements to derive a voltage, which, with correct tuning, reaches an extreme negative value; this voltage being supplied as a negative bias voltage to the first control-grid of the low-frequency tube 16. By way of example, Fig. 1 shows that the said control-voltage serving to make the low-frequency amplifying tube 16 inoperative, is taken from a third circuit 8, which is coupled slightly inductively with the circuit 7 and which is substantially not coupled with the circuit 6. With such a cascade arrangement of tuned circuits a phase shift of 90° occurs with tuning for each circuit. The circuit 8 is also tuned to the intermediate frequency and the voltage occurring across this circuit will thus have a phase shift of 180° with respect to the voltage across the circuit 6, if tuning is correct. Part of the voltage occurring across the circuit 6 is supplied through a capacitor 9 to the circuit 8. The tappings of the inductors of the circuits 6 and 8 are chosen to be such that if tuning is correct the part of the voltage supplied from circuit 6 and that supplied from circuit 8 are equal to one another, so that no intermediate-frequency voltage occurs across diode 18, which is connected between the circuit 8 and the capacitor 19 which is connected to earth. A resistor 20 is connected in parallel with the diode 18; resistors 21 and 22 and capacitors 23 and 24 serve to smooth the control-voltage obtained from the diode 18.

It should be noted that the arrangement of the tuned circuits 6, 7 and 8 is not essential for the invention and that the control-voltage used to make the tube 16 inoperative may be obtained in other ways. Thus, for example, it may be derived from the noise voltage, for example, by means of a separate noise amplifier. It is only essential that the said voltage, in the case of correct tuning, should have a comparatively low and preferably zero value and that, with increasing detuning, it should become rapidly more negative.

The direct voltage occurring across the resistor 20 becomes operative at the first control-grid of the tube 16, since between the said control-grid and the resistor 21 a resistor 25 is connected and since the right-hand end of the resistor 22 is connected to the cathode of the tube

16 via a resistor 26. The cathode of the tube 16 is connected to earth through the series combination of resistors 26 and 27. The alternating voltages are obtained via capacitors 28 and 29.

The circuit-arrangement described above operates as follows:

If a signal is received and if the apparatus is tuned correctly, no rectified voltage occurs across the resistor 20. The grid bias voltage of the tube 16 is then determined by the voltage drop across the cathode resistor 26, this drop being comparatively small so that the tube 16 amplifies normally. The diode 10 serves to provide an automatic gain control voltage across resistor 11 and diode 13 is a delay diode which allows the control voltage to be developed only when the signal voltage is not too weak. The cathode circuit of tube 16 comprises the resistors 26 and 27, across which a voltage occurs which is proportional to the cathode current of the tube 16. This voltage is of opposite polarity to the voltage developed across resistor 11 and it renders the grid of the tube 1 positive, but it is counter-acted by the voltage occurring across the resistors 3 and 4 in the cathode lead of the tube 1 during normal operation. The conditions are preferably chosen to be such that the said two voltages neutralize one another exactly, if the tube 16 is operating normally.

If there is a deviation from the correct tuning, a voltage detected by the diode 18 will occur at the lower end of the circuit 8. Then a rectified voltage occurs across the resistor 20, this voltage providing a negative bias voltage at the control-grid of the tube 16 such that, if the deviation from correct tuning is sufficiently great, tube 16 becomes substantially inoperative. Consequently, the voltage drop across the resistors 26 and 27 disappears and the negative bias voltage of the control-grid of the tube increases by the same value. Consequently, a strong reduction of the intermediate-frequency voltage operating across the circuit 6 occurs.

A diode 34 is provided to prevent the common point of the resistors 26 and 27 from reaching an excessively high negative voltage. The anode of the diode 34 may have a positive voltage of a few volts with respect to earth. As soon as the voltage across the resistor 27 drops below a given value the diode conducts and the said voltage remains constant.

It should be noted that, if there is no signal at all, no rectified signal voltage occurs across the resistor 20 in the arrangement shown in Fig. 1. However, even in this case, the tube 16 can be made inoperative by means of the noise voltages, which are very high in this case and which produce a sufficiently high voltage across the resistor 20.

In Fig. 2 corresponding parts to those of Fig. 1 are designated by the same reference numerals. The anode of the intermediate-frequency amplifying tube 1 comprises the circuit 6, the voltage of which is supplied through the capacitor 14 to the anode of a diode 37. The latter serves to provide an automatic gain control voltage. The cathode of a diode 37 is connected to the cathode of the low-frequency amplifying tube 16, to the first control-grid of which are again supplied the low-frequency oscillations obtained in a manner not shown, e. g. from a circuit coupled to the circuit 6. A voltage E, derived in an arbitrary manner, e. g. by amplifying and detecting the noise voltages taken from a circuit coupled to the circuit 6, for cutting off the tube 16 operates between the first control grid of the tube 16 and a tapping of the resistor 26. The direct automatic gain control voltage occurs across a resistor 36. The voltage across the resistor 26 provides a threshold voltage for the diode 37. The automatic gain control voltage is taken from the anode of the diode 37. The circuit of the control-voltage furthermore comprises the resistor 27. With normal operation, the voltage occurring across resistor 27 is compensated by the voltage occurring across the resistors 3 and 4.

With a definite deviation from correct tuning, a voltage occurs across the terminals 40, by which the anode current of the tube 16 is cut off. At the same time the voltage across the resistor 27 disappears, so that the bias voltage at the control-grid of the tube 1 becomes abruptly considerably more negative. The voltage across the resistor 26 also decreases strongly, which means that the automatic gain control threshold voltage substantially decreases and the control-voltage increases. This is a favourable property of the circuit-arrangement shown in Fig. 2.

The diode 37 and the pentode 16 may form a diode-pentode.

What I claim is:

1. In a radio receiver, the combination comprising a radio frequency stage and a low-frequency amplifying stage, said low-frequency stage including an electron discharge tube having a cathode, a grid, an output electrode and circuits therefor, means coupled to said high-frequency stage and responsive to detuning of said receiver relative to the frequency of an incoming signal to produce a negative voltage increasing in value as determined by the extent of the detuning of said receiver, means to apply said negative voltage to the control grid of the tube to control the amplification thereof, an automatic gain control circuit responsive to said incoming signal and producing an automatic gain control voltage having an intensity determined by the intensity of said incoming signal, said voltage being applied to said high-frequency stage to effect gain control thereof, means coupled to said tube to develop a control potential varying with the mean carrier wave amplitude of said incoming signal, means to apply said control potential to said automatic gain control circuit to counteract said automatic gain control voltage, said control potential being reduced in intensity when said tube becomes inoperative to an extent at which the total voltage for the automatic gain control increases in absolute value.

2. A combination, as set forth in claim 1, wherein said means coupled to said tube to develop a control potential includes a first resistor disposed in the cathode circuit of said tube which is made inoperative with a given detuning.

3. A combination, as set forth in claim 2, further including means for providing a third substantially constant voltage having a polarity counteracting said control potential and substantially neutralizing it when the low-frequency tube operates normally.

4. A combination, as set forth in claim 3, wherein said third voltage providing means includes a second resistor disposed in the cathode circuit of said radio frequency stage.

5. A combination, as set forth in claim 4, wherein a point of said second resistor is connected to a point of positive potential.

References Cited in the file of this patent

UNITED STATES PATENTS

| | | |
|---|---|---|
| 2,194,557 | Keall | Mar. 26, 1940 |
| 2,294,117 | Hollingsworth | Aug. 25, 1942 |
| 2,455,450 | Thompson | Dec. 7, 1948 |
| 2,533,543 | Young | Dec. 12, 1950 |
| 2,630,527 | Vilkomerson | Mar. 3, 1953 |